United States Patent
Lee

(10) Patent No.: US 10,133,111 B2
(45) Date of Patent: Nov. 20, 2018

(54) PROTECTIVE PANEL FOR DISPLAY DEVICE AND DISPLAY DEVICE INCLUDING THE SAME

(75) Inventor: Hyun Hee Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 13/593,927

(22) Filed: Aug. 24, 2012

(65) Prior Publication Data

US 2013/0094184 A1 Apr. 18, 2013

(30) Foreign Application Priority Data

Oct. 18, 2011 (KR) ........................ 10-2011-0106676

(51) Int. Cl.
| | | |
|---|---|---|
| *G02F 1/1335* | (2006.01) | |
| *G06F 1/16* | (2006.01) | |
| *H04M 1/02* | (2006.01) | |
| *G02F 1/133* | (2006.01) | |

(52) U.S. Cl.
CPC ...... *G02F 1/133512* (2013.01); *G06F 1/1626* (2013.01); *H04M 1/0266* (2013.01); *G02F 1/13318* (2013.01); *G06F 2200/1634* (2013.01); *H04M 1/0283* (2013.01)

(58) Field of Classification Search
CPC .............. G02F 2001/133331; G02F 1/133512
USPC ...................................................... 349/14, 16
See application file for complete search history.

(56) References Cited

U.S. PATENT DOCUMENTS

| 4,325,633 | A | * | 4/1982 | Gardner | .................. G01S 3/783 |
| | | | | | 250/227.28 |
| 2002/0093609 | A1 | * | 7/2002 | Baek | ................. G02F 1/134336 |
| | | | | | 349/113 |
| 2007/0097108 | A1 | * | 5/2007 | Brewer | ..................... G02B 6/06 |
| | | | | | 345/204 |
| 2008/0158173 | A1 | * | 7/2008 | Hamblin et al. | ............... 345/173 |
| 2009/0161051 | A1 | | 6/2009 | Fukunaga et al. | |
| 2010/0164921 | A1 | | 7/2010 | Ino et al. | |
| 2011/0255000 | A1 | * | 10/2011 | Weber et al. | ................. 348/374 |
| 2012/0050225 | A1 | * | 3/2012 | Chou | ...................... G06F 3/041 |
| | | | | | 345/175 |

(Continued)

FOREIGN PATENT DOCUMENTS

| CN | 1743938 A | 3/2006 |
| CN | 1786780 A | 6/2006 |

(Continued)

OTHER PUBLICATIONS

Chinese Office Action dated Aug. 4, 2014 of corresponding Chinese Patent Application No. 201210397554.0—11 pages.

*Primary Examiner* — Edward Glick
*Assistant Examiner* — Anthony G Quash
(74) *Attorney, Agent, or Firm* — Lewis Roca Rothgerber Christie LLP

(57) ABSTRACT

A protective panel for a display device includes a substrate and a light-blocking layer provided over the substrate. A display window is defined on a region of the substrate where the light-blocking layer is not provided. The light-blocking layer includes a first layer which comprises a first material having a first color. The protective panel further includes a hole formed through the light-blocking layer. The hole having an inner sidewall, which is clad with a cladding material having a color different from the first color.

19 Claims, 8 Drawing Sheets

(56) References Cited

U.S. PATENT DOCUMENTS

| | | | | |
|---|---|---|---|---|
| 2012/0206669 A1* | 8/2012 | Kim | .................... | G06F 1/1686 |
| | | | | 349/58 |
| 2013/0021662 A1* | 1/2013 | Fike, III | ................ | G02B 26/02 |
| | | | | 359/291 |
| 2013/0048837 A1* | 2/2013 | Pope | .................... | G01J 1/0422 |
| | | | | 250/214.1 |
| 2013/0177302 A1* | 7/2013 | Weber | .................. | G06F 1/1626 |
| | | | | 396/155 |

FOREIGN PATENT DOCUMENTS

| | | | |
|---|---|---|---|
| CN | 1991501 A | 7/2007 | |
| CN | 203179411 U | 9/2013 | |
| JP | 2005-338645 | * 12/2005 | ........... G02F 1/1335 |
| JP | 2005-338645 A | 12/2005 | |
| JP | 2009-105771 A | 5/2009 | |
| JP | 2009-151039 A | 7/2009 | |
| JP | 2010-020237 A | 1/2010 | |
| JP | 2010-249983 A | 11/2010 | |
| JP | 2011-049473 A | 3/2011 | |
| JP | 2011-054929 | 3/2011 | |
| JP | 2011-194799 A | 10/2011 | |
| KR | 10-2003-0058719 A | 7/2003 | |
| KR | 10-2008-0037187 A | 4/2008 | |
| KR | 10-2008-0057524 A | 6/2008 | |
| KR | 10-2010-0094288 A | 8/2010 | |
| KR | 10-2010-0109645 A | 10/2010 | |
| KR | 10-2011-0019157 A | 2/2011 | |

* cited by examiner

PROTECTIVE PANEL FOR DISPLAY DEVICE AND DISPLAY DEVICE INCLUDING THE SAME

CROSS-REFERENCE TO RELATED APPLICATIONS

This application claims priority to and the benefit of Korean Patent Application No. 10-2011-0106676 filed on Oct. 18, 2011, the disclosure of which is herein incorporated by reference in its entirety.

BACKGROUND

1. Field of Disclosure

The present disclosure relates to a protective panel for a display device.

2. Discussion of the Related Technology

Various display devices such as televisions, mobile phones, navigations, computer monitors, and game consoles have been developed.

The display device may include a display panel, and a window panel or protective panel. The protective panel may be disposed at the outside of the display device to protect the display panel from getting damaged by an external force. A black color layer may be disposed on a surface of the panel corresponding to a non-display region of the display panel, so that the inside of the display panel may be not shown. The color coating layer may have another color (e.g., white color) other than the black color. The foregoing discussion in the background section is to provide background information, and does not constitute an admission of prior art.

SUMMARY

An aspect of the invention provides a protective panel for a display device. The protective panel comprises a substrate; a light-blocking layer provided over the substrate, wherein a display window is defined on a region of the substrate where the light-blocking layer is not provided, wherein the light-blocking layer comprises a first layer which comprises a first material having a first color; and a hole formed through the light-blocking layer, the hole having an inner sidewall, which is clad with a cladding material having a color different from the first color.

In the foregoing panel, the cladding material may have a light absorbance greater than the first material. The inner sidewall of the hole may comprise a stepped surface clad with the cladding material. The light-blocking layer may comprise a first surface facing the substrate and a second surface facing away from the substrate, wherein a portion of the second surface is clad with the cladding material. The light blocking layer may further comprise a second layer, the first layer being disposed between the second layer and the substrate, the second layer comprising a second material which has a second color different from the first color, wherein the inner sidewall of the hole comprises a first portion of the first layer and a second portion of the second layer, wherein either or both the first and second portions are clad with the cladding material. The protective panel may further comprise a light-transmitting layer provided over the substrate and located within the hole, wherein the light-transmitting layer has a light transmittance different from that of the substrate.

Another aspect provides a display device comprising: a display panel comprising a display surface on which information is to be displayed; the foregoing protective panel, which is disposed over the display panel, wherein the display surface and the display window are aligned for viewing the information through the display window; and a light detector disposed under the protective panel and aligned with the hole for detecting light beams incident to the display device through the hole.

In the foregoing device, the display device may further comprise a light emitter disposed under the protective panel and aligned with the hole for emitting light beams to outside the display device through the hole. The light emitter and detector may be implemented in a single piece component located underneath the hole, wherein the single piece component is further configured to coordinate emission of light beams and detection of incident light beams and to cause determining whether detected incident light beams are reflection of the light beams emitted from the light emitter on an object located outside the display device.

Still another aspect of the invention provides a protective panel for a display device. The protective panel comprises: a substrate comprising a display region and a non-display region; a first layer disposed over the non-display region of the substrate, the first layer being in a first color; a second layer disposed over the first layer, the first layer being disposed between the second layer and the substrate, the second layer being in a second color different from the first color; a hole formed through the first and second layers, the hole comprising an inner sidewall comprising a first portion of the first layer and a second portion of the second layer; and a cladding disposed on at least part of the first portion of the inner sidewall, the cladding having a color different from the first color.

In the foregoing protective panel, the cladding may be further disposed on at least part of the second portion of the inner sidewall. The first layer may comprise a first surface facing the substrate and a second surface facing away from the substrate, wherein a portion of the second surface is exposed through the hole and the cladding is further disposed on the exposed portion. The protective panel may further comprise an additional layer disposed over the base substrate and located within the hole, the additional layer is configured to transmit light incident toward the hole. The first layer may be in substantially white color. The cladding may be in substantially black color.

A further aspect provides a display device comprising: a display panel configured to display an image; a housing containing the display panel; and the foregoing protective panel disposed over the display panel.

In the foregoing device, the display device may further comprise: a light sensor device contained in the housing and aligned with the hole, wherein the light sensor device comprises: a light emitter configured to emit light to the outside of the display device through the hole, and a light receiver configured to receive the light emitted from the light emitter and reflected on an object located outside of the display device. The light may comprise infrared light. The cladding may be configured to inhibit an infrared light incident toward the hole from being reflected by at least one of the first and second layers. The protective panel of Claim 10, wherein the cladding has a light absorbance greater than the first layer.

Embodiments of the present invention provide a protective panel for a display device capable of preventing light outputted from a light sensor device from being scatteredly reflected.

Embodiments of the present invention also provide a display device including a protective panel for a display device capable of preventing light outputted from a light sensor device from being scatteredly reflected.

According to embodiments of the present invention, a protective panel includes: a base substrate including a display region and a non-display region adjacent to at least a portion of the display region; a first color layer disposed on one surface of the base substrate to correspond to at least a portion of the non-display region, the first color layer having a first opening; a second color layer disposed on the surface of the base substrate, the first color layer disposed between the second color layer and the surface of the base substrate, and the second color layer having a second opening corresponding to the first opening; and a third color layer disposed on at least an inner sidewall of the first opening.

In some embodiments, the third color layer may be further disposed on at least a portion of an inner sidewall of the second opening.

In other embodiments, the second opening may have an area greater than an area of the first opening when viewed in a direction perpendicular to the protective panel, and the second opening may expose a portion of the first color layer. The third color layer may be further disposed on the portion of the first color layer exposed by the second opening.

In still other embodiments, third color layer may be further disposed on an inner sidewall of the second opening.

In yet other embodiments, the third color layer may be further disposed on at least a portion of an exposed surface of the first color layer.

In yet still other embodiments, the first color layer may have substantially white color. The third color layer may have substantially black color.

According to embodiments of the present invention, a display device includes; a display panel displaying an image; a housing receiving the display panel; and a protective panel disposed on the display panel. The protective panel may be applied with one of the protective panels according to various embodiments of the present invention.

In some embodiments, the display device may further include a light sensor device contained in the housing and disposed to correspond to the second opening. The light sensor device includes a light emitter generating light and a light receiver receiving the light generated from the light emitter. The light may be infrared light.

BRIEF DESCRIPTION OF THE DRAWINGS

Embodiments of the present invention will become more apparent in view of the attached drawings and accompanying detailed description.

DETAILED DESCRIPTION

Figure 1:
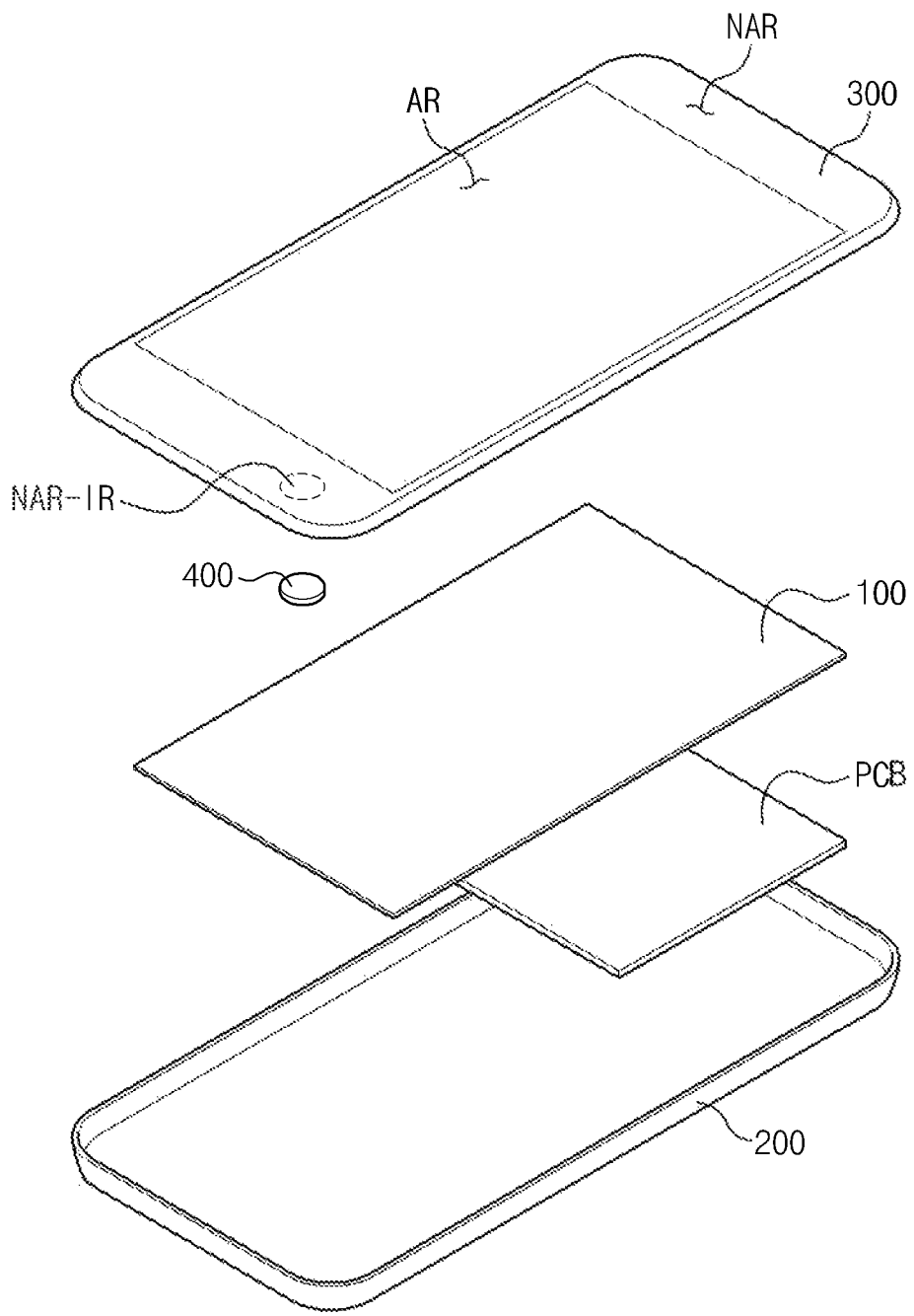
FIG. 1 is an exploded perspective view showing a display device according to some embodiments of the present invention.

Embodiments of the present invention will now be described more fully hereinafter with reference to the accompanying drawings. The advantages and features of the present invention and methods of achieving them will be apparent from the following embodiments that will be described in more detail with reference to the accompanying drawings. It should be noted, however, that the present invention is not limited to the following embodiments, and may be implemented in various forms. Accordingly, the embodiments are provided only to disclose the present invention and let those skilled in the art know the category of the present invention. In the drawings, embodiments of the present invention are not limited to the specific examples provided herein and are exaggerated for clarity.

Hereinafter, embodiments of the present invention will be explained in detail with reference to the accompanying drawings.

A display device may include a display panel, a protective panel, and a light sensor device. The light sensor device may be disposed under the panel and include a light emitter and a light receiver. Light (e.g., infrared light) emitted from the light emitter to outside through the protective panel may be reflected by a user or other objects present in front of the display device. And, the light receiver may receive the reflected light. Thus, it is possible to switch the display of an image depending on the receipt of the reflected light. In such a way, the display device can be controlled to decrease power consumption.

A color (e.g., white color) other than black may be used for coating a non-display region of the protective panel. Generally, the white color has light reflection property greater than that of the black color. Thus, the light outputted from the light emitter may be reflected by the coating layer and scattered, and the light receiver may recognize the reflected and scattered light. Accordingly, even though a user is not present in front of the protective panel, the display device may be erroneously operated.

FIG. 1 is an exploded perspective view showing a display device according to some embodiments of the present invention.

A display device according to some embodiments of the present invention may be a handheld electronic device, for example, a mobile phone as illustrated in FIG. 1. However, it should not be limited thereto. The display device according to some embodiments of the present invention may be applied to various information providing devices such as televisions, navigations, computer monitors, or game consoles.

The display device according to some embodiments of the present invention may include a display panel 100, a housing 200 receiving the display panel 100, and a window panel or protective panel 300 disposed on the display panel 100.

In embodiments, the display panel 100 displays an image. The display panel 100 may not particularly be limited. For example, the display panel 100 may include one of various display panels such as an organic light emitting display panel, a liquid crystal display panel, a plasma display panel, an electrophoretic display panel, and an electrowetting display panel.

The housing 200 receives the display panel 100. The housing 200 with a single piece is illustrated in FIG. 1. However, the present invention is not limited thereto. Two or more members may be combined to form the housing 200.

In embodiments, the housing 200 may further receive a circuit board PCB on which a plurality of active elements (not shown) and a plurality of passive elements (not shown) are mounted. Additionally, the housing 200 may further receive a power supply unit such as a battery compatible to the display device.

The protective panel 300 is disposed on the display panel 100. The protective panel 300 is combined with the housing 200 and forms an outside surface of the display device in company with the housing 200. At this time, the display panel 100 may be combined or bonded with the protective panel 300.

In embodiments, the protective panel 300 includes a display region AR which has a display window for displaying the image generated by the display panel 100 and a non-display panel NAR adjacent to at least a portion of the display region AR when viewed in a direction perpendicular to the outside surface of the protective panel.

In embodiments, the image is not displayed through the non-display region NAR. At least a portion of the non-display region NAR is defined as a light sensor region NAR-IR which has a light sensor window. A first opening OP1 of a first color layer 320 is disposed at the light sensor region NAR-IR as described below.

In embodiments, the display device may further include a light sensor device 400. The light sensor device 400 is received in the housing 200 to emit light through the light sensor region NAR-IR and receive a portion of the emitted light through the light sensor region NAR-IR. The light emitted from the light sensor device 400 proceeds to the outside of the protective panel 300 and can be reflected by a user or objects present in front of or adjacent the protective panel. The light sensor device 400 receives the reflected light and it is possible to switch the display of the image depending on the receipt of the reflected light. In embodiments, the light may be mainly infrared light.

Even though not shown in FIG. 1, in embodiments, the display device may further a touch panel. The touch panel may be a resistive touch panel or a capacitive touch panel.

Figure 2:
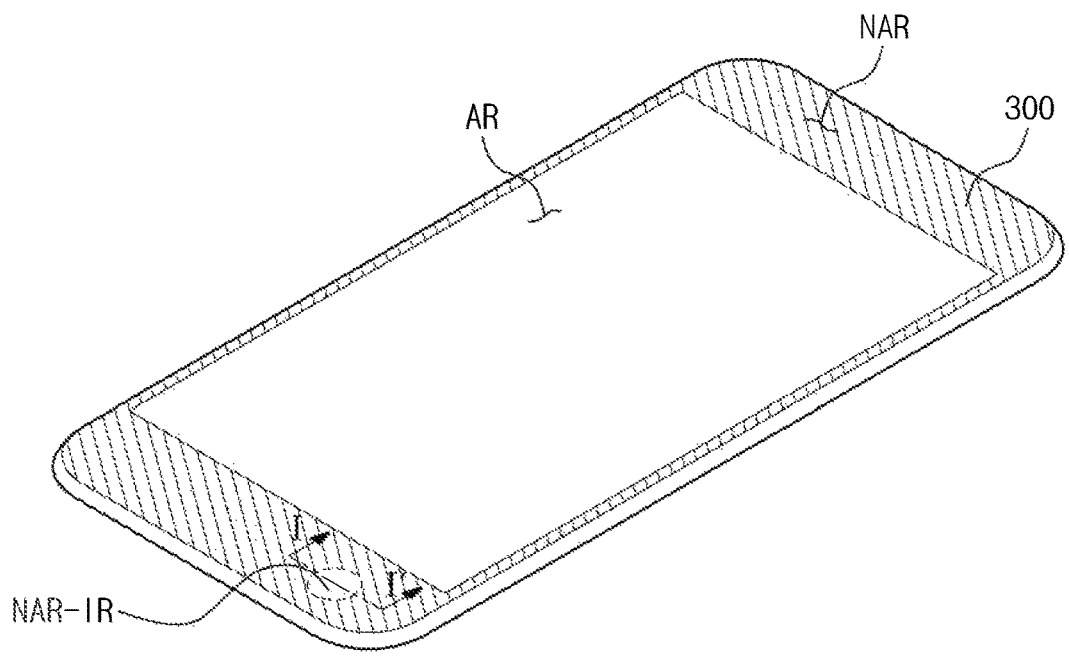
FIG. 2 is a perspective view showing a protective panel for a display device according to some embodiments of the present invention.

FIG. 2 is a perspective view showing a protective panel for a display device according to some embodiments of the present invention. FIGS. 3 through 8 are cross-sectional views taken along a line I-I' of FIG. 2 to show various embodiments of the present invention. In FIGS. 3 through 8, the same elements as each other will be indicated by the same reference numerals or the same reference designators.

Hereinafter, the protective panel 300 according to an embodiment of the present invention will be described with reference to FIGS. 2 and 3 in more detail.

In embodiments, the protective panel 300 includes a base substrate 310, a first color coating layer 320 provided with a first opening OP1, a second color layer 330 provided with a second opening OP2, and a third color layer or cladding 340. In embodiments, the first layer 320 and the second color layer 330 form a light-blocking layer. A hole extends through the light-blocking layer, and includes the first opening OP1 at the first layer 320 and the second opening 330.

In embodiments, the base substrate 310 is a transparent plate-like substrate. The base substrate 310 includes a display region AR through which the image passes, and a non-display region adjacent to at least a portion of the display region AR when viewed in a direction perpendicular to the outside surface of the protective panel.

As shown in FIG. 2, in embodiments, the display region AR may be surrounded by the non-display region NAR. However, the present invention is not limited thereto. In other embodiments, the non-display region NAR may be divided into two regions and the display region AR may be disposed between the two regions of the non-display region NAR.

In embodiments, the base substrate 310 may include glass. In particular, the base substrate 310 may include a tempered glass having a hardness greater than that of a general glass. Alternatively, the base substrate 310 may include plastic. In particular, the base substrate 310 may include a transparent reinforced plastic such as polycarbonate.

The first color layer 320 is disposed on a surface of the base substrate 310 opposite to the outside surface. The first color layer 320 is formed over at least a portion of the non-display region NAR. FIG. 2 shows the first color 320 corresponding to the entire portion of the non-display region NAR as an example. The first color layer 320 may absorb or reflect the light incident from the other surface of the base substrate 310 facing the outside.

In embodiments, the first color layer 320 may have substantially white color which has the greatest light reflection grade. However, the present invention is not limited thereto. For example, the first color layer 320 may have one of red color, green color, blue color, brown color, gray color, pink color, and yellow color. In the illustrated embodiment, other colors have a light absorbance smaller than black color.

In embodiments, the first color layer 320 may be provided in plural sub-layers. For example, since the white color has a light blocking property weaker than other colors, the first color layer 320 having the white color may be provided in plural sub-layers more than the first color layer 320 having other colors.

The first color layer 320 has a first opening OP1. The first opening OP1 corresponds to the light sensor region NAR-IR. FIG. 2 shows the protective panel 300 including the first color layer 320 having one first opening OP1 as an example. FIG. 2 shows the first opening OP1 having a circle shape in a plan view. However, it should not be limited thereto. The first opening OP1 may have any shape through which the light can pass. For example the first opening OP1 may have a triangle shape, a quadrangle shape, an ellipse shape, or an irregular shape in a plan view.

The second color layer 330 is disposed over the first color coating layer such that the first color layer 320 is disposed between the second color layer 330 and the surface of the base substrate 300. The second color layer 330 is disposed to correspond to at least a portion of the first color layer 320. The second color layer 330 absorbs or reflects the light incident from the other surface of the base substrate 310 in company with the first color layer 320.

The second color layer 330 may have gray color. However, it should be not limited thereto. In embodiments, the second color layer 330 may be recognized from the outside of the display device through the first color layer 320. Thus, the second color layer 330 may have a color does not hinder the color of the first color layer 320 from being viewed from the outside.

The second color layer 330 may be provided in plural sub-layers.

The second color layer 330 has a second opening OP2. The second opening OP2 corresponds to the first opening OP1. The second opening OP2 may have a circle shape in a plan view. However, it should not be limited thereto. The second opening OP2 may have one of various shapes through which the light can pass. For example the second opening OP2 may have a triangle shape, a quadrangle shape, an ellipse shape, or an irregular shape in a plan view.

The third color layer or cladding 340 is disposed to minimize the reflection of the light incident toward the first and second openings OP1 and OP2 by at least one of the first and second color layers 320 and 330.

The third color layer or color lining 340 is disposed on an inner sidewall of the first opening OP1. The third color layer 340 covers a sidewall of the first color layer 320 surrounding the first opening OP1 such that the first color layer 320 is not exposed through the first opening OP1.

The third color layer 340 may have substantially black color. However, it should not be limited thereto. The third color layer 340 may have any color capable of inhibiting the light toward the first and second openings OP1 and OP2 from being reflected by at least one of the first and second color layers 320 and 330. In at least some of the embodiments described herein, the first color layer 340 may have a light absorbance greater than that of each the first and second color layers 320 and 330.

The third color layer 340 may be provided in plural sub-layers.

Hereinafter, each of the protective panels 300 shown in FIGS. 4 through 8 according to various embodiments of the present invention includes a base substrate 310, a first color layer 320, a second color layer 330, and a third color layer 340. The protective panels 300 shown in FIGS. 4 through 8 according to embodiments of the present invention include substantially the same base substrate 310 and the same first color layer 320 as those of the protective panel 300 shown in FIG. 3 according to an embodiment of the present invention. Thus, descriptions of the same elements 310 and 320 will be omitted or mentioned briefly, and the second and third color layers 330 and 340 shown in FIGS. 4 through 8 will be described in more detail.

Figure 4:
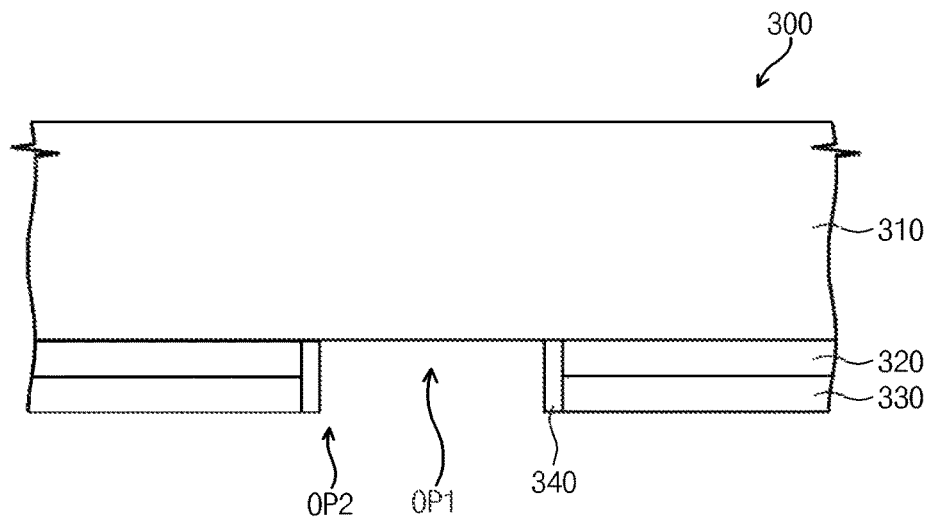
FIG. 4 is a cross-sectional view taken along a line I-I' of FIG. 2 to show a protective panel for a display device according to an embodiment of the present invention.

Hereinafter, the protective panel 300 according to another embodiment of the present invention will be described with reference to FIGS. 2 and 4.

Figure 3:
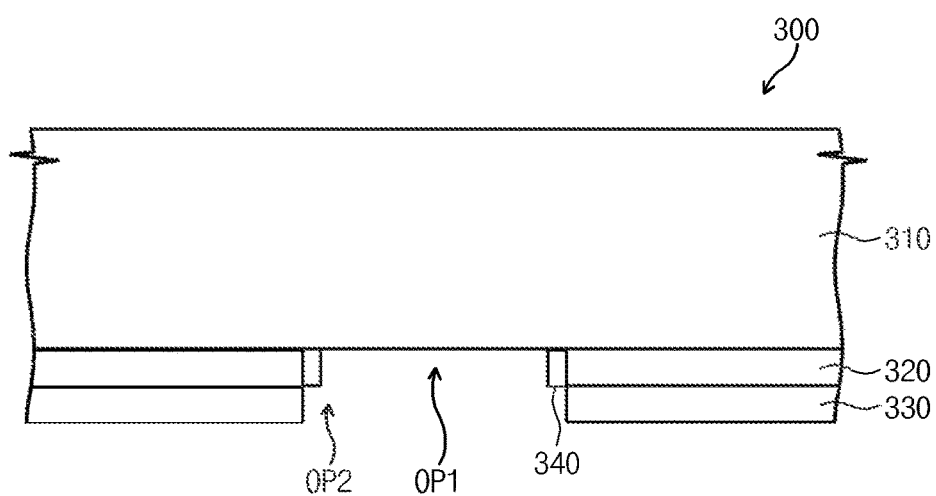
FIG. 3 is a cross-sectional view taken along a line I-I' of FIG. 2 to show a protective panel for a display device according to an embodiment of the present invention.

The second color layer 330 is substantially the same as the second color layer 330 in FIG. 3. Thus, the description of the second color layer 330 is omitted for brevity.

The third color layer 340 is disposed to prevent the light incident toward the first and second openings OP1 and OP2 from being reflected by at least one of the first and second color layers 320 and 330.

The third color layer 340 is disposed on an inner sidewall of the first opening OP1 and at least a portion of an inner sidewall of the second opening OP2. The third color layer 340 prevents a sidewall of the first color layer 320 surrounding the first opening OP1 and a portion of the second color layer 330 surrounding the second opening OP2 from being exposed.

The third color layer 340 may have substantially black color. However, it should not be limited thereto. The third color layer 340 may have any color capable of protecting the light toward the first and second openings OP1 and OP2 from being reflected by at least one of the first and second color layers 320 and 330.

The third color layer 340 may be provided in plural sub-layers.

Hereinafter, the protective panel 300 according to an embodiment of the present invention will be described with reference to FIGS. 2 and 5.

The second color layer 330 is disposed on the first color layer 320 and over the base substrate 310 such that the second color layer 330 is disposed to correspond to at least a portion of the first color layer 320. In other words, the first color layer 320 is disposed between the second color layer 330 and the surface of the base substrate 300. The second color layer 330 absorbs or reflects the light incident from the other surface of the base substrate 310 in company with the first color layer 320.

The second color layer 330 may have gray color. However, it should be not limited thereto. Since the second color layer 330 may be recognized from the outside of the display device by the light which is incident from the other surface of the base substrate 310 to pass through the first color layer 320, the second color layer 330 may have any color capable of maintaining the color of the first color layer 320.

The second color layer 330 has a second opening OP2. The second opening OP2 corresponds to the first opening OP1. The second opening OP2 has a greater area than an area of the first opening OP1 when viewed in a direction perpendicular to the outside surface of the protective panel. The second opening OP2 may expose a portion of the first color layer 320. The second opening OP2 may have a circle shape in a plan view. However, it should not be limited thereto. The second opening OP2 may have one of various shapes through which the light can pass. For example the second opening OP2 may have a triangle shape, a quadrangle shape, an ellipse shape, or an irregular shape in a plan view.

The second color layer 330 may be provided in plural sub-layers.

The third color layer or cladding 340 is disposed to prevent the light incident toward the first and second openings OP1 and OP2 from being reflected by at least one of the first and second color layers 320 and 330.

The third color layer 340 is disposed on the inner sidewall of the first opening OP1 and the portion of the first color layer 320 exposed through the second opening OP2. The third color layer 340 prevents a sidewall of the first color layer 320 surrounding the first opening OP1, the portion of the first color layer 320 exposed through the second opening OP2, and a portion of a sidewall of the second color layer 330 surrounding the second opening OP2 from being exposed.

The third color layer 340 may have substantially black color. However, it should not be limited thereto. The third color layer 340 may have any color capable of preventing the light toward the first and second openings OP1 and OP2 from being reflected by at least one of the first and second color layers 320 and 330.

The third color layer 340 may be provided in plural sub-layers.

Figure 6:
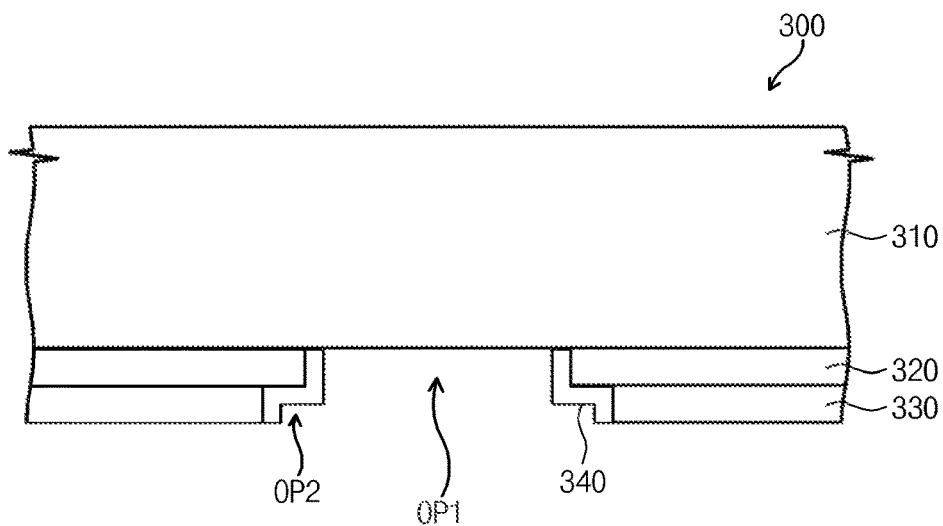
FIG. 6 is a cross-sectional view taken along a line I-I' of FIG. 2 to show a protective panel for a display device according to an embodiment of the present invention.

Hereinafter, the protective panel 300 according to an embodiment of the present invention will be described with reference to FIGS. 2 and 6.

Figure 5:
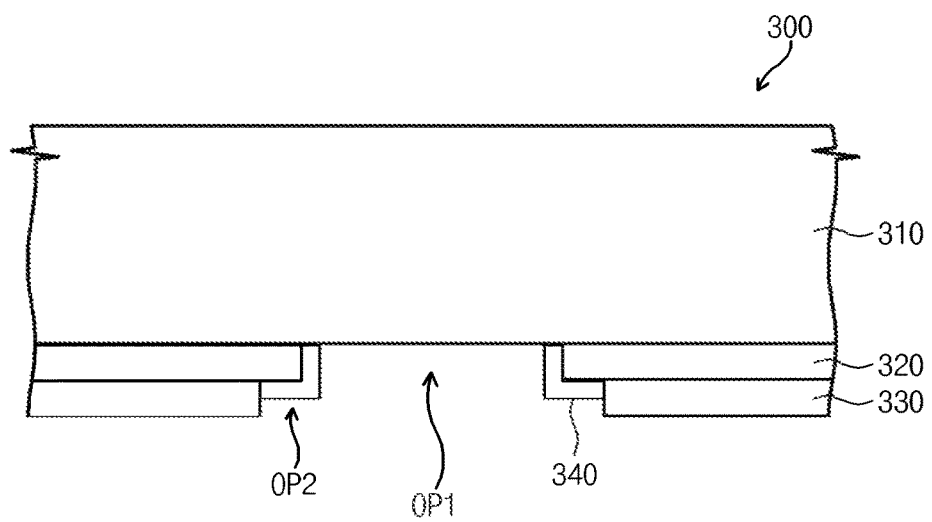
FIG. 5 is a cross-sectional view taken along a line I-I' of FIG. 2 to show a protective panel for a display device according to an embodiment of the present invention.

The second color layer 330 is substantially the same as the second color layer 330 in FIG. 5. Thus, the description of the second color layer 330 is omitted for brevity.

The third color layer 340 is disposed to minimize the reflection of the light incident toward the first and second openings OP1 and OP2 by at least one of the first and second color layers 320 and 330.

The third color layer 340 is disposed on the inner sidewall of the first opening OP1, the portion of the first color layer 320 exposed by the second opening OP2, and the inner sidewall of the second opening OP2. The third color layer 340 prevents the sidewall of the first color layer 320 surrounding the first opening OP1, the portion of the first color layer 320 exposed by the second opening OP2, and the sidewall of the second color layer 330 surrounding the second opening OP2 from being exposed.

The third color layer 340 may have substantially black color. However, it should not be limited thereto. The third color layer 340 may have any color capable of inhibiting the light toward the first and second openings OP1 and OP2 from being reflected by at least one of the first and second color layers 320 and 330.

The third color layer 340 may be provided in plural sub-layers.

Figure 7:
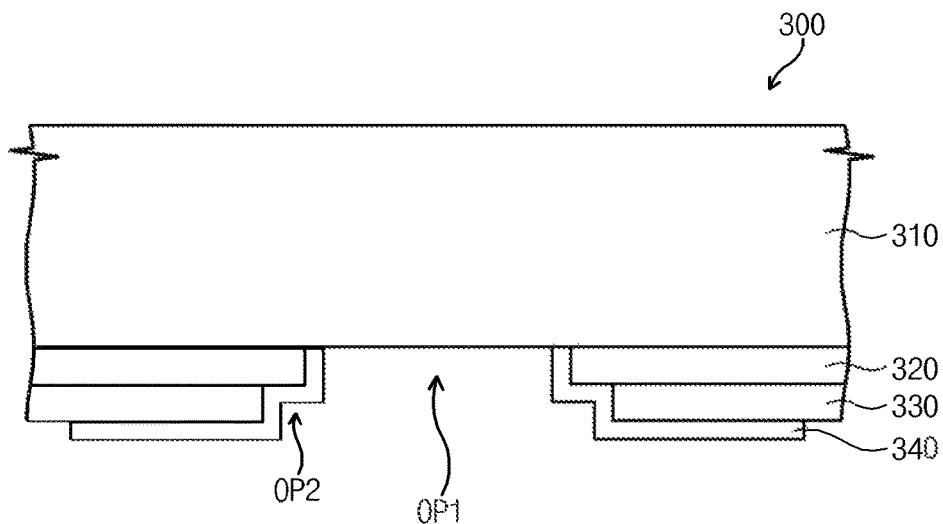
FIG. 7 is a cross-sectional view taken along a line I-I' of FIG. 2 to show a protective panel for a display device according to an embodiment of the present invention.

Hereinafter, the protective panel 300 according to an embodiment of the present invention will be described with reference to FIGS. 2 and 7.

The second color layer or cladding 330 is substantially the same as the second color layer 330 in FIG. 5. Thus, the description of the second color layer 330 is omitted for brevity.

The third color layer 340 is disposed to prevent the light incident toward the first and second openings OP1 and OP2 from being reflected by at least one of the first and second color layers 320 and 330.

The third color layer 340 is disposed on the inner sidewall of the first opening OP1, the portion of the first color layer 320 exposed through the second opening OP2, the inner sidewall of the second opening OP2, and at least a portion of an exposed surface of the second color layer 330. The third color layer 340 prevents the sidewall of the first color layer 320 surrounding the first opening OP1, the portion of the first color layer 320 exposed by the second opening OP2, the sidewall of the second color layer 330 surrounding the second opening OP2, and the at least a portion of an exposed surface of the second color layer 330 from being exposed.

The third color layer 340 may have substantially black color. However, it should not be limited thereto. The third color layer 340 may have any color capable of minimizing the reflection of the light toward the first and second openings OP1 and OP2 by at least one of the first and second color layers 320 and 330.

The third color layer 340 may be provided in plural sub-layers.

Figure 8:
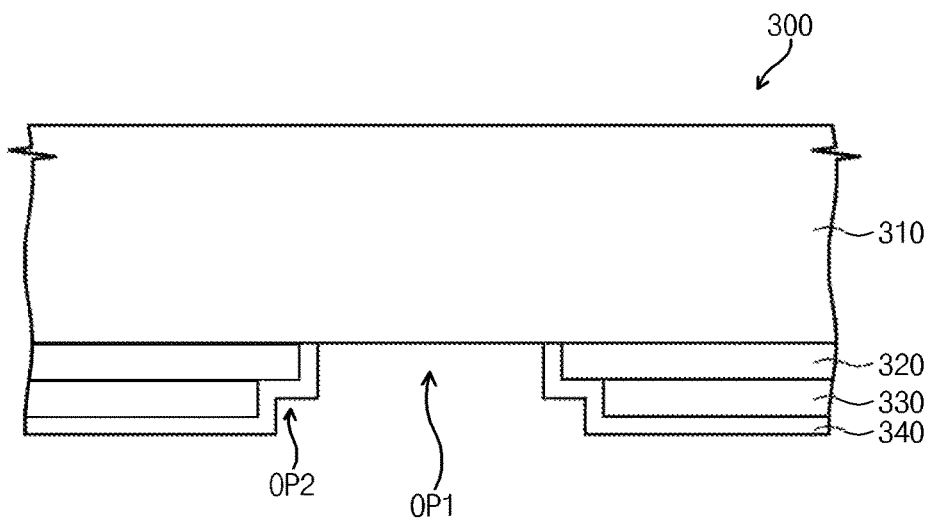
FIG. 8 is a cross-sectional view taken along a line I-I' of FIG. 2 to show a protective panel for a display device according to an embodiment of the present invention.

Hereinafter, the protective panel 300 according to an embodiment of the present invention will be described with reference to FIGS. 2 and 8.

The second color layer 330 is substantially the same as the second color layer 330 in FIG. 5. Thus, for brevity, the description of the second color layer 330 is omitted for brevity.

The third color layer 340 is disposed to prevent the light incident toward the first and second openings OP1 and OP2 from being reflected by at least one of the first and second color layers 320 and 330.

The third color layer 340 is disposed on the inner sidewall of the first opening OP1, the portion of the first color layer 320 exposed by the second opening OP2, the inner sidewall of the second opening OP2, and the entire exposed surface of the second color layer 330. The third color layer 340 prevents the sidewall of the first color layer 320 surrounding the first opening OP1, the portion of the first color layer 320 exposed by the second opening OP2, the sidewall of the second color layer 330 surrounding the second opening OP2, and the entire exposed surface of the second color layer 330 from being exposed.

The third color layer 340 may have substantially black color. However, it should not be limited thereto. The third color layer 340 may have any color capable of preventing the light toward the first and second openings OP1 and OP2 from being reflected by at least one of the first and second color layers 320 and 330.

The third color layer 340 may be provided in plural sub-layers.

Hereinafter, the protective panel 300 according to an embodiment of the present invention will be described with reference to FIGS. 2 and 9.

Figure 9:
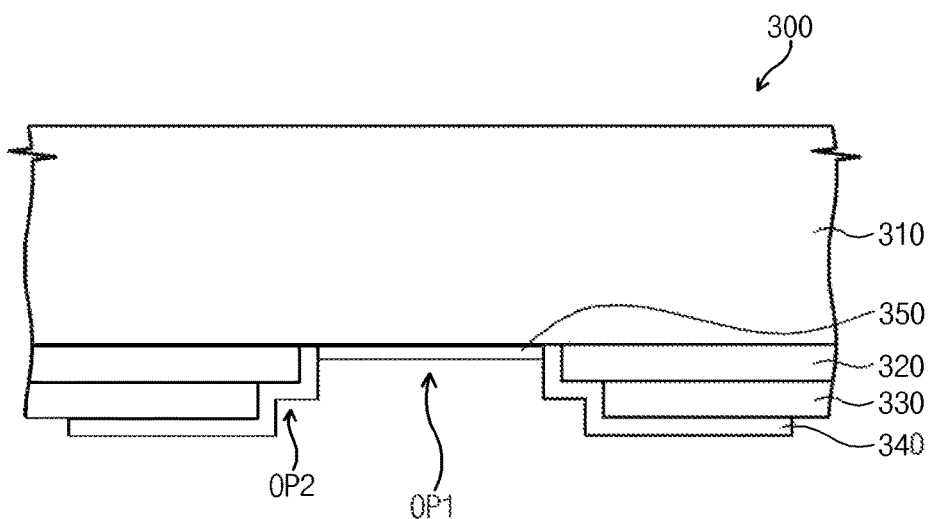
FIG. 9 is a cross-sectional view taken along a line I-I' of FIG. 2 to show a protective panel for a display device according to an embodiment of the present invention.

A protective panel 300 for a display device shown in FIG. 9 includes a base substrate 310, a first color layer 320, a second color layer 330, a third color layer 340, and a fourth color layer 350. The protective panel 300 shown in FIG. 9 according to an embodiment of the present invention includes substantially the same base substrate 310, the same first color layer 320, the same second color layer 330, and the same third color layer 340 as those of the protective panel 300 shown in FIG. 7. Thus, descriptions of the same elements 310, 320, 330, and 340 will be omitted or mentioned briefly, and the fourth color layer 350 will be described in more detail.

The fourth color layer 350 transmits a portion of the light incident toward the first opening OP1. Transmittance of the incident light may be controlled according to color and a thickness of the fourth color layer 350. In embodiments, the fourth color layer 350 has a light transmittance smaller than that of the base substrate. In embodiments, the fourth color layer 350 has a light transmittance greater than that of each of the first, second and third color layers.

The fourth color layer 350 may be disposed on the surface of the base substrate 310 on which the first color layer 320 is disposed. The fourth color layer 350 may be disposed on a region corresponding to the first opening OP1 of the surface of the base substrate 310. The fourth color layer 350 may be disposed on a region corresponding to the second opening OP2 as well as the first opening OP1. In other words, the fourth color layer 350 may be disposed on the surface of the base substrate 300 exposed by the first opening OP1. The fourth color layer 350 may have a thickness less than a sum of thicknesses of the first, second, and third color layers 320, 330, and 340.

In embodiments, the fourth color layer 350 may have one of any colors under a condition that the fourth color layer 350 controls the transmittance of the light incident toward the first opening OP1. The fourth color may be provided in plural sub-layers.

Figure 10:
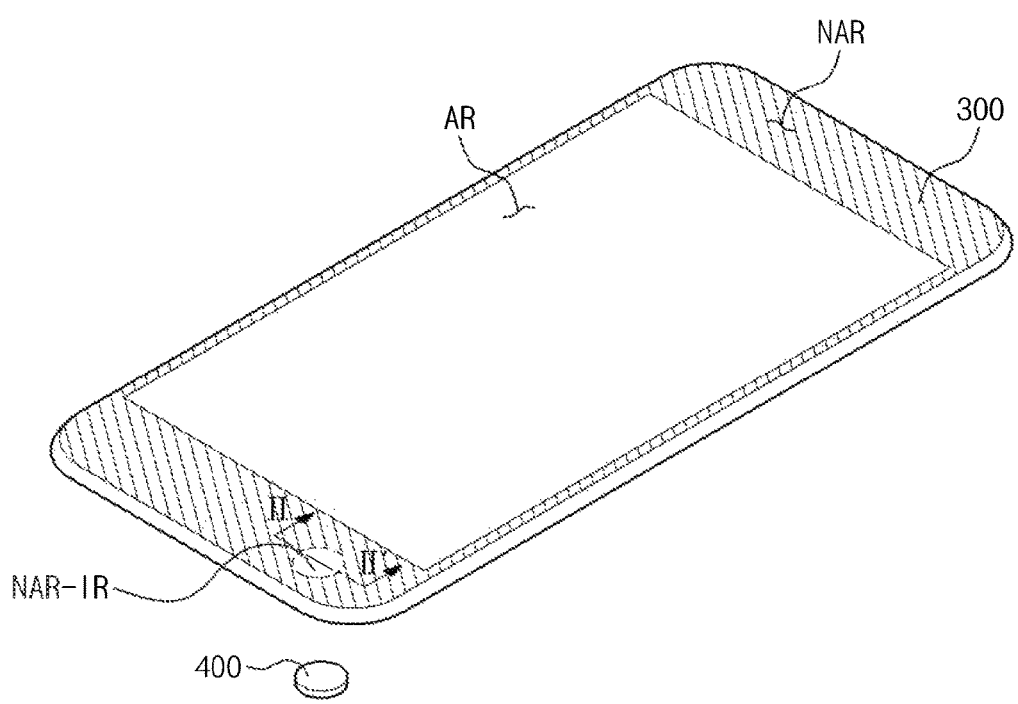
FIG. 10 is a perspective view showing a protective panel and a light sensor device in accordance with an embodiment of the invention.
Figure 11A:
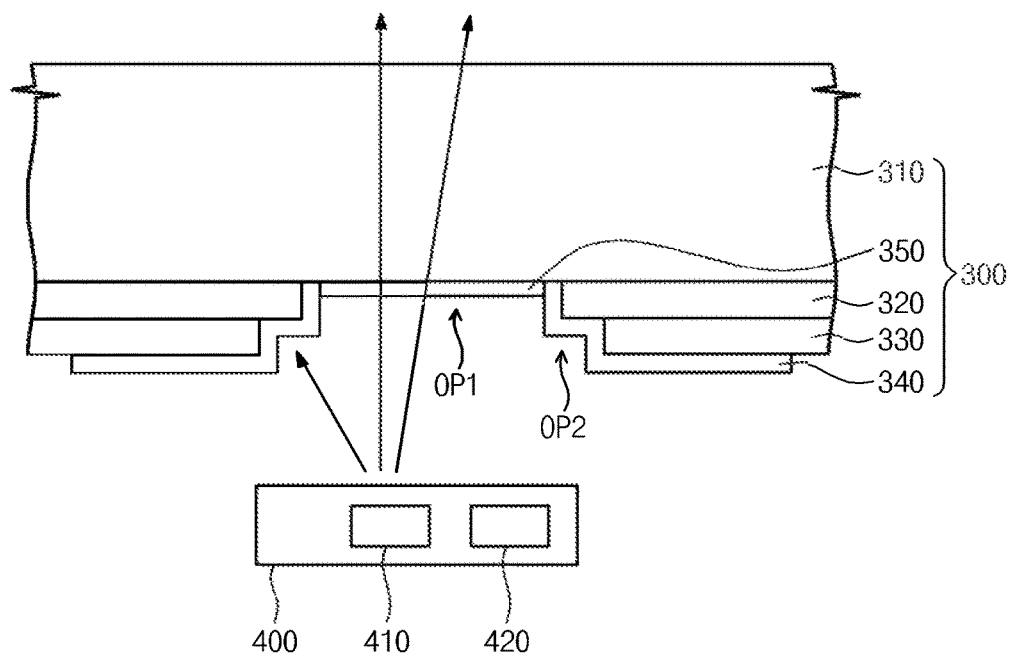
FIG. 11A is a cross-sectional view taken along a line II-II' of FIG. 10 showing the state that a user is not present in front of a protective panel.
Figure 11B:
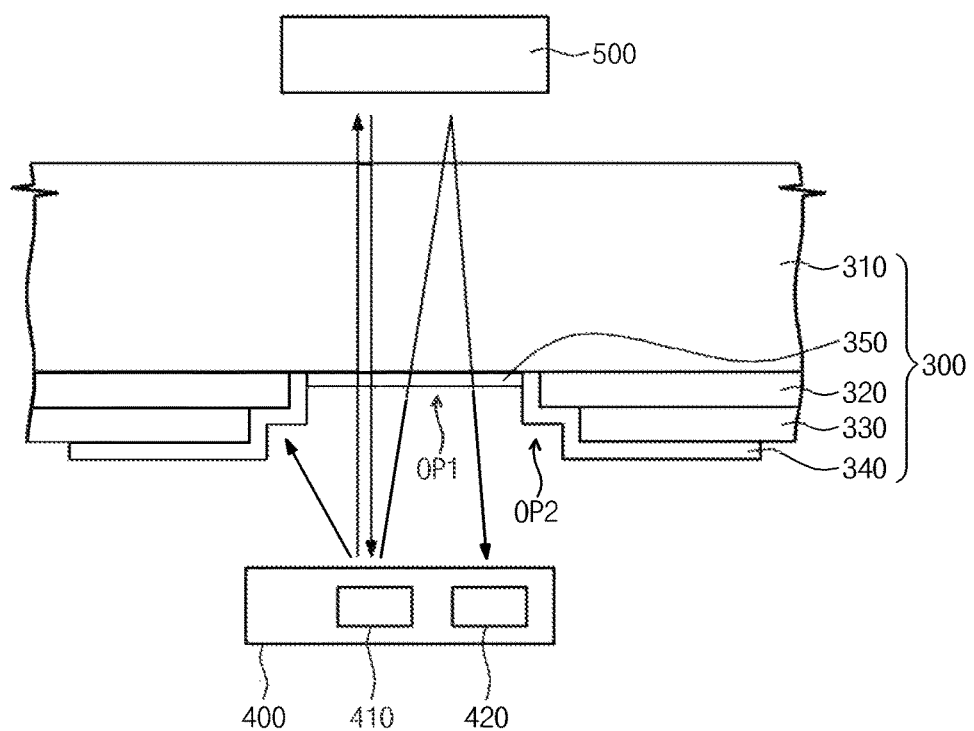
FIG. 11B is a cross-sectional view taken along a line II-II' of FIG. 10 showing the state that a user is not present in front of a protective panel.

FIG. 10 is a perspective view showing the protective panel for a display device of FIG. 9 and a light sensor device 400, and FIGS. 11A and 11B are cross-sectional views taken along a line II-II' of FIG. 10. In FIGS. 10, 11A, and 11B, the same element is indicated by the same reference numeral or the same reference designator.

The protective panel 300 shown in FIGS. 10, 11A, and 11B is substantially the same as the protective panel 300 shown in FIG. 9. Thus, the descriptions of the protective panel 300 are omitted or mentioned briefly. Contents relative to the light sensor device 400 will be described in more detail.

Referring to FIGS. 10, 11A, and 11B, the protective panel 300 includes a display region AR and a non-display region NAR adjacent to at least a portion of the display region AR when viewed in a direction perpendicular to the outside surface of the protective panel. In embodiments, at least a portion of the non-display region NAR is defined as a light sensor region NAR-IR. One light sensor region NAR-IR is shown in FIGS. 11A and 11B. However, it should not be limited thereto. The protective panel may have a plurality of light sensor regions.

In embodiments, the light sensor device 400 is disposed inside the display device and at a location corresponding to the light sensor region NAR-IR. The light sensor device 400 includes a light emitter 410 and a light receiver 420. FIGS. 11A and 11B show the light emitter 410 and the light receiver 420 are disposed at a location corresponding to one light sensor region NAR-IR. However, it should not be limited thereto. In other embodiments, the light emitter 410 may be disposed in a location corresponding to a light sensor region, and the light receiver 420 may be disposed at another location corresponding to another light sensor region.

In embodiments, the light emitter 410 outputs the light from the inside of the display device toward the outside of the display device through the first and second openings OP1 and OP2, and the fourth layer 350 and the base substrate 310. The light may be infrared light. In embodiments, a portion of the light outputted toward the outside of the display device passes through the fourth color layer 350, and the amount of transmitted light is controlled by the fourth color layer 350. If the fourth color layer 350 does not exist, the ratio of transmitted infrared light with respect to the light generated from the light emitter 410 and passing through the base substrate 310 may be about 90%. However, the ratio of the infrared light passing through the fourth color layer 350 and the base substrate 310 with respect to the light generated from the light emitter 410 may have a range of about 75% to about 85%. In embodiments, since the transmittance of the infrared light is controlled by the fourth color layer 350, it is possible to prevent the infrared light from being excessively outputted toward the outside of the display device. At least a portion of the light, which is generated from the light emitter 410 to output toward the outside of the display device, is reflected by a user 500 present in front of or adjacent to the display device and is incident toward the light receiver 420 through the first and second openings OP1 and OP2. The light receiver 420 receives the reflected light. Thus, it is possible to switch the display of the image depending on the receipt of the reflected light by the light receiver 420.

FIG. 11A is a cross-sectional view showing the protective panel 300 and the light sensor device 400 to explain an operation of the light sensor device 400 when no user 500 is present, and FIG. 11B is a cross-sectional view showing the protective panel 300 and the light sensor device 400 to explain an operation of the light sensor device 400 when a user 500 is present.

Referring to FIG. 11A, when no user 500 is present, a portion of the light generated from the light emitter 410 is outputted toward the outside of the display device through the first and second openings OP1 and OP2. Another portion of the light generated from the light emitter 410 is transmitted to the first to third color layers 320, 330, and 340 and is mostly absorbed into the third color layer 340.

The light emitted from the light emitter 410 is not reflected and is not received into the light receiver 420. Thus, the display device may be operated in ON mode.

Referring to FIG. 11B, when a user 500 is present, a portion of the light, which is generated from the light emitter 410 to be outputted toward the outside of the display device, is reflected by the user 500 and incident into the inside of the display device through the first and second openings OP1 and OP2, and thus, the light receiver 420 receives the incident light. Another portion of the light generated from the light emitter 410 is transmitted to the first to third color layers 320, 330, and 340 and is mostly absorbed into the third color layer 340.

The user 500 reflecting the light may be replaced with any other objects or any motion capable of reflecting the portion of the light emitted from the light emitter 410. For example, the means for reflecting the light may be a touch of a user or a user spaced apart from the display device by a predetermined distance. Alternatively, the means for reflecting the light may be an object.

The light emitted from the light emitter 410 is reflected by the user 500 and received into the light receiver 420. Thus, the display device may be operated in OFF mode.

In an alternative embodiment, the display device may be operated in OFF mode when the reflected light is not received, and the display device may be operated in ON mode when the reflected light is received.

According to embodiments of the present invention, the protective panel for the display device prevents the light incident toward at least one of the first and second color layers from being scatteredly reflected.

According to embodiments of the present invention, the display device including the protective panel prevents the light incident toward at least one of the first and second color layers from being scatteredly reflected to proceed into the light sensor device. Since the light is prevented from being scattered and reflected, an operation failure of the light sensor device is minimized.

While the present invention has been described with reference to example embodiments, it will be apparent to those skilled in the art that various changes and modifications may be made without departing from the spirit and scope of the present invention. Therefore, it should be understood that the above embodiments are not limiting, but illustrative. Thus, the scope of the present invention is to be determined by the broadest permissible interpretation of the following claims and their equivalents, and shall not be restricted or limited by the foregoing description.

What is claimed is:

1. A display device, comprising:
a display panel configured to display an image; and
a protective panel disposed over the display panel, wherein the protective panel comprising:
a single-piece transparent substrate comprising a display region through which the image passes and a non-display region through which the image does not pass;
a light-blocking layer provided over the non-display region of the single-piece transparent substrate, wherein the light-blocking layer comprises a first layer; and
a hole formed through the light-blocking layer, the hole defining an inner sidewall;

a cladding formed over the inner sidewall, wherein the single-piece transparent substrate comprises a lower surface having a portion that is exposed by the hole and the cladding, wherein the first layer has a substantially white color, wherein the cladding has a substantially black color, wherein the cladding does not penetrate into the single-piece transparent substrate and wherein the exposed portion of the lower surface does not overlap the display panel.

2. The display device of claim 1, wherein the cladding comprises a material has a light absorbance greater than the first material.

3. The display device of claim 1, wherein the inner sidewall of the hole comprises a stepped surface clad with the cladding.

4. The display device of claim 1, wherein the light-blocking layer comprises a first surface facing the single-piece transparent substrate and a second surface facing away from the single-piece transparent substrate, wherein a portion of the second surface is clad with the cladding.

5. The display device of claim 1, wherein the light blocking layer further comprises a second layer, the first layer being disposed between the second layer and the single-piece transparent substrate, the second layer comprising a second material which has a second color different from the first color,
wherein the inner sidewall of the hole comprises a first portion belonging to the first layer and a second portion belonging to the second layer, wherein either or both the first and second portions are clad with the cladding.

6. The display device of claim 1, wherein the protective panel further comprises a light-transmitting layer provided over the single-piece transparent substrate and located within the hole, wherein the light-transmitting layer has a light transmittance different from that of the single-piece transparent substrate.

7. The display device of claim 1,
wherein the display surface and the display region are aligned for viewing the information through the display region; and
a light detector disposed under the protective panel and aligned with the hole for detecting light beams incident to the display device through the hole.

8. The display device of claim 7, wherein the protective panel further comprises:
a light emitter disposed under the protective panel and aligned with the hole for emitting light beams to outside the display device through the hole.

9. The display device of claim 8, wherein the light emitter and detector are implemented in a single piece component located underneath the hole, wherein the single piece component is further configured to coordinate emission of light beams and detection of incident light beams and to cause determining whether detected incident light beams are reflection of the light beams emitted from the light emitter on an object located outside the display device.

10. The display device of claim 8 further comprising:
a housing containing the display panel,
wherein the protective panel is disposed over the display panel.

11. The display device of claim 10, further comprising:
a light sensor device contained in the housing and aligned with the hole, wherein the light sensor device comprises:
a light emitter configured to emit light to the outside of the display device through the hole; and
a light receiver configured to receive the light emitted from the light emitter and reflected on an object located outside of the display device.

12. The display device of claim 11, wherein the light comprises infrared light.

13. The display device of claim 1, wherein the hole is not formed through the single-piece transparent substrate.

14. A display device comprising:
a display panel configured to display an image; and
a protective panel disposed over the display panel, wherein the protective panel comprising:
a single-piece transparent substrate comprising a display region through which the image passes and a non-display region through which the image does not pass;
a first layer disposed over the non-display region of the single-piece transparent substrate, the first layer being in a first color;
a second layer disposed over the first layer, the first layer being disposed between the second layer and the single-piece transparent substrate, the second layer being in a second color different from the first color;
a hole formed through the first and second layers, the hole defining an inner sidewall, which comprises a first inner sidewall belonging to the first layer and a second inner sidewall belonging to the second layer; and
a cladding disposed on at least part of the first inner sidewall,
wherein the single-piece transparent substrate comprises a lower surface having a portion that is exposed by the hole, wherein the first layer has a substantially white color, wherein the cladding has a substantially black color, and wherein the cladding does not penetrate into the single-piece transparent substrate and wherein the exposed portion of the lower surface does not overlap the display panel.

15. The display device of claim 14, wherein the cladding is further disposed on at least part of the second inner sidewall.

16. The display device of claim 14, wherein the first layer comprises a first surface facing the single-piece transparent substrate and a second surface facing away from the single-piece transparent substrate, wherein a portion of the second surface is covered by the cladding.

17. The display device of claim 14, wherein the protective panel further comprises:
an additional layer disposed over the single-piece transparent substrate and located within the hole, the additional layer is configured to transmit light incident toward the hole.

18. The display device of claim 14, wherein the cladding is configured to inhibit an infrared light incident toward the hole from being reflected by at least one of the first and second layers.

19. The display device of claim 14, wherein the cladding has a light absorbance greater than the first layer.

* * * * *